US010967822B1

(12) United States Patent
Ramos, II et al.

(10) Patent No.: US 10,967,822 B1
(45) Date of Patent: Apr. 6, 2021

(54) COMBINED LIGHTING ASSEMBLIES FOR REAR BUMPERS AND VEHICLES INCORPORATING THE SAME

(71) Applicant: Toyota Motor Engineering & Manufacturing North America, Inc., Plano, TX (US)

(72) Inventors: Frank A Ramos, II, Ypsilanti, MI (US); Chung Lee, Plano, TX (US); Alexander Paradis, Ypsilanti, MI (US); Stuart Wuerthele, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/685,308

(22) Filed: Nov. 15, 2019

(51) Int. Cl.
*B60R 19/50* (2006.01)
*B60R 13/10* (2006.01)
(Continued)

(52) U.S. Cl.
CPC ............ *B60R 19/50* (2013.01); *B60D 1/06* (2013.01); *B60D 1/48* (2013.01); *B60Q 1/0035* (2013.01); *B60Q 1/0041* (2013.01); *B60Q 1/24* (2013.01); *B60Q 1/56* (2013.01); *B60R 13/105* (2013.01); *B60R 2019/505* (2013.01)

(58) Field of Classification Search
CPC ......... B60R 19/50; B60R 13/105; B60D 1/06; B60D 1/48; B60Q 1/0035; B60Q 1/0041; B60Q 1/24; B60Q 1/56
See application file for complete search history.

(56) References Cited

U.S. PATENT DOCUMENTS 3,196,265 A * 7/1965 Schneider ................ B60Q 1/28
362/505
4,503,487 A * 3/1985 Kakuda .................... B60Q 1/56
362/249.01
(Continued)

FOREIGN PATENT DOCUMENTS

| CN | 2626784 U | 7/2004 |
| CN | 206306933 U | 7/2017 |
| DE | 102007041120 A1 | 3/2009 |

OTHER PUBLICATIONS

"03-15 Dodge RAM Truck Pickup 6K White LED illumination License Plate + Rear Lights;" https://www.ebay.com/itm/03-15-Dodge-RAM-Truck-Pickup-6K-White-LED-illumination-License-Plate-Rear-Lights-/121761988650; Published/Accessed: Sep. 25, 2018.

*Primary Examiner* — Erin Kryukova
*Assistant Examiner* — Christopher E Dunay
(74) *Attorney, Agent, or Firm* — Dinsmore & Shohl LLP

(57) ABSTRACT

A vehicle that includes a rear bumper having a license plate well recessed into the rear bumper and a combined lighting assembly disposed at the rear bumper. The combined lighting assembly includes a lighting body having an outward facing portion coupled to a sideward facing portion by a turned portion. The sideward facing portion extends into the license plate well. The combined lighting assembly also includes a rearward facing light having a rearward illumination region directed in the vehicle rearward direction from the outward facing portion and a license plate light having a sideward illumination region directed into the license plate well.

20 Claims, 5 Drawing Sheets

(51) Int. Cl.
  *B60Q 1/00* (2006.01)
  *B60Q 1/56* (2006.01)
  *B60D 1/48* (2006.01)
  *B60D 1/06* (2006.01)
  *B60Q 1/24* (2006.01)

(56) References Cited

U.S. PATENT DOCUMENTS

| | | | |
|---|---|---|---|
| 4,831,503 A * | 5/1989 | DeSantis | B60Q 1/2626 |
| | | | 362/497 |
| 7,160,008 B2 | 1/2007 | Pan | |
| 7,318,663 B2 | 1/2008 | Verbrugh et al. | |
| 2003/0012029 A1 * | 1/2003 | McCoy | B60Q 1/305 |
| | | | 362/505 |
| 2006/0028830 A1 | 2/2006 | Tsai | |
| 2012/0013137 A1 * | 1/2012 | Rinklin | B60R 19/18 |
| | | | 293/155 |
| 2015/0021942 A1 * | 1/2015 | Evans | B29C 51/10 |
| | | | 293/142 |
| 2015/0345938 A1 * | 12/2015 | Salter | G01B 11/272 |
| | | | 116/28 R |
| 2019/0033150 A1 * | 1/2019 | Lassche | B60D 1/485 |

\* cited by examiner

US 10,967,822 B1

COMBINED LIGHTING ASSEMBLIES FOR REAR BUMPERS AND VEHICLES INCORPORATING THE SAME

TECHNICAL FIELD

The present specification generally relates to lighting assemblies and, more specifically, to combined lighting assemblies disposed at a rear bumper and including a rearward facing light, a license plate light, and a towing hitch light.

BACKGROUND

Vehicles may be equipped with towing hitches to tow various towable items (e.g., boats, RVS, trailers, etc.). However, often these towable items are attached to the towing hitch of the vehicle during times of day when lighting may not be particularly suited for such endeavors. Poor lighting may make it difficult for vehicle operators to singularly attach the towable items to the vehicle via the towing hitch and thus towing hitch lighting is needed. Furthermore, lighting is needed for additional purposes at the rear of the vehicle, such as license plate lighting, brake lighting, and back-up lighting (i.e., lighting indicating that the vehicle is in a reverse gear). However, these lights are often disposed in individual assemblies located at various locations along the vehicle rear, requiring complicated wiring and manufacture.

Accordingly, a need exists for a compact lighting assembly that achieves multiple lighting functions at the rear of a vehicle, including lighting the towing hitch and the license plate, as well as providing a back-up light, a brake light, or both.

SUMMARY

In one embodiment, a vehicle includes a rear bumper having a license plate well recessed into the rear bumper and a combined lighting assembly disposed at the rear bumper. The combined lighting assembly includes a lighting body having an outward facing portion coupled to a sideward facing portion by a turned portion. The sideward facing portion extends into the license plate well. The combined lighting assembly also includes a rearward facing light having a rearward illumination region directed in the vehicle rearward direction from the outward facing portion and a license plate light having a sideward illumination region directed into the license plate well.

In another embodiment, a combined lighting assembly for a vehicle includes a lighting body having an outward facing portion coupled to a sideward facing portion by a turned portion, a rearward facing light coupled to the outward facing portion and including a rearward illumination region directed in a vehicle rearward direction from the outward facing portion, and a license plate light coupled to the sideward facing portion of the lighting and including a sideward illumination region directed in a vehicle longitudinal direction from the sideward facing portion of the lighting body.

In yet another embodiment, a vehicle includes a rear bumper having a bumper surface and a license plate well recessed into the rear bumper, the license plate well including a first well wall opposite a second well wall, each extending from the bumper surface to a plate mounting surface. The vehicle also includes a first combined lighting assembly having a first lighting body with a first outward facing portion coupled to a portion of the bumper surface adjacent the first side of the license plate well, a first sideward facing portion coupled to the first well wall, and a first turned portion extending between and coupled to the first outward facing portion and the first sideward facing portion and a second combined lighting assembly having a second lighting body having a second outward facing portion coupled to a portion of the bumper surface adjacent the second side of the license plate well, a second sideward facing portion coupled to the second well wall, and a second turned portion extending between and coupled to the second outward facing portion and the second sideward facing portion. Further, the first combined lighting assembly and the second combined lighting assembly each include a rearward facing light having a rearward illumination region directed in the vehicle rearward direction and a license plate light having a sideward illumination region directed toward the plate mounting surface of the license plate well.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles, such as trucks or other vehicles comprising a towing hitch for attaching a towable item to the vehicle, that include a combined lighting assembly comprising multiple lights disposed in a single, compact assembly. The combined lighting assembly includes a lighting body having an outward facing portion that may be coupled to a rear bumper of the vehicle, a sideward facing portion that may extend into a license plate well, and a turned portion between the outward facing portion and the sideward facing portion. The combined lighting assembly provides multi-directional illumination at the rear of the vehicle using at least two lights. In particular, the combined lighting assembly comprises two or more of a rearward facing light directed from the outward facing portion in a vehicle rearward direction, which may operate as a reverse light or a brake light, a license plate light directed from the sideward facing portion into the license plate well to illuminate a license plate, and a towing hitch light directed from the turned portion to illuminate the towing hitch. Furthermore, embodiments described herein may include two combined lighting assemblies, one disposed on each side of the license plate well to provide a combination or sub-combination of two reverse lights or brake lights, a license plate light directed onto the license plate from two sides of the license plate well, and towing hitch lights that illuminate the towing hitch from multiple locations. The combined lighting assembly and vehicles comprising the combined lighting assembly will now be described in more detail herein with specific reference to the corresponding drawings.

Directional terms as used herein describe the relative positions and orientations of various components of the present embodiments. As used herein, "vehicle longitudinal direction" may refer to two opposite directions transverse to the length of the vehicle, i.e., the +X direction and the −X direction. As used herein, the "vehicle lengthwise direction" may refer to two opposite directions along the length of the vehicle, i.e., the +Y direction and the −Y direction. In particular, the "vehicle rearward direction" is the −Y direction and "vehicle forward direction" is the +Y direction. The vehicle rearward direction extends from the front of the vehicle to the rear of the vehicle and moreover, extends rearward from the rear of the vehicle. The vehicle forward direction extends from the rear of the vehicle to the front of the vehicle, and moreover, extends forward from the front of the vehicle. As used herein, the "vehicle vertical direction," may refer to two opposite vertical directions relative to the vehicle, i.e., the +Z direction and the −Z direction. In particular, the "vehicle upward direction" extends in the +Z direction and the "vehicle downward direction" extends in the −Z direction.

Figure 1:
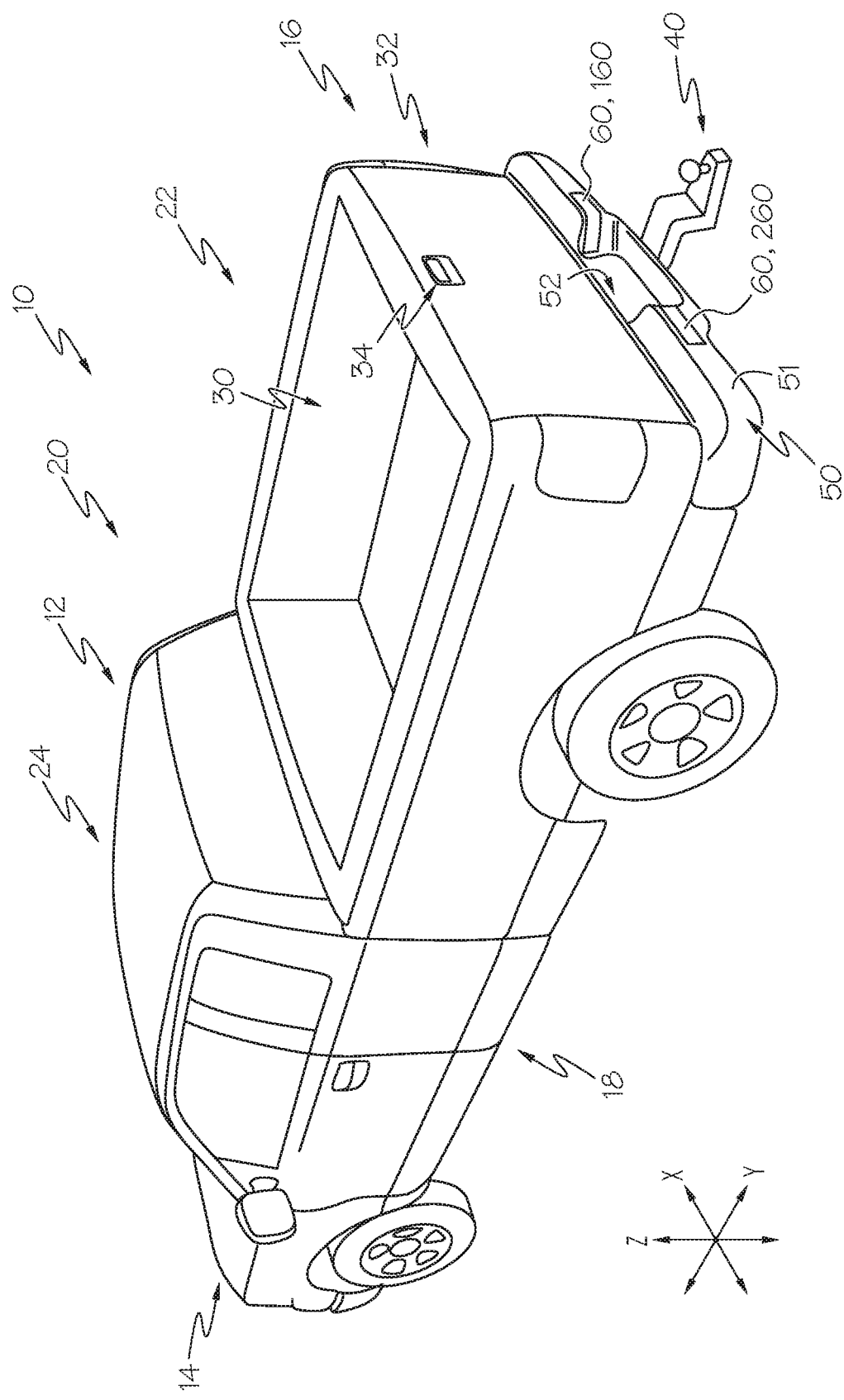
FIG. 1 is a perspective view of a vehicle including a combined lighting assembly, according to one or more embodiments shown and described herein.

Referring now to FIG. 1, the vehicle 10 includes a vehicle body 12 having a front 14, a rear 16, sides 18 and 20 that extend between the front 14 and the rear 16 in a vehicle longitudinal direction, a rear bumper 50 extending across the rear 16, and a combined lighting assembly 60 disposed at the rear bumper 50. In particular, the vehicle 10 comprises a first combined lighting assembly 160 and a second combined lighting assembly 260. While the combined lighting assembly 60 is often described herein as a singular assembly, it should be understood that descriptions of the combined lighting assembly 60 may apply to the first combined lighting assembly 160, the second combined lighting assembly 260, or both. Moreover, while two combined lighting assemblies are depicted, it should be understood that embodiments comprising a single combined lighting assembly and embodiments comprising more than two combined lighting assemblies are contemplated.

Referring still to FIG. 1, in the illustrated embodiment, the vehicle 10 is a truck including a cargo area 22 that is formed rearward of a cabin area 24, and a towing hitch 40 coupled to the vehicle body 12. The towing hitch 40 extends beyond the rear bumper 50 in a vehicle rearward direction and is disposed below the rear bumper 50 in a vehicle downward direction. In the illustrated embodiments, the vehicle 10 comprises a truck including a tailgate assembly 32 pivotably coupled to the truck bed assembly 30 and may include a tailgate handle 34 that can be used to release the tailgate assembly 32 from latch components in order to move the tailgate assembly 32 from a raised position to a lowered position. While the vehicle 10 is depicted as a truck, it should be understood that any type of vehicle is contemplated.

Figure 2:
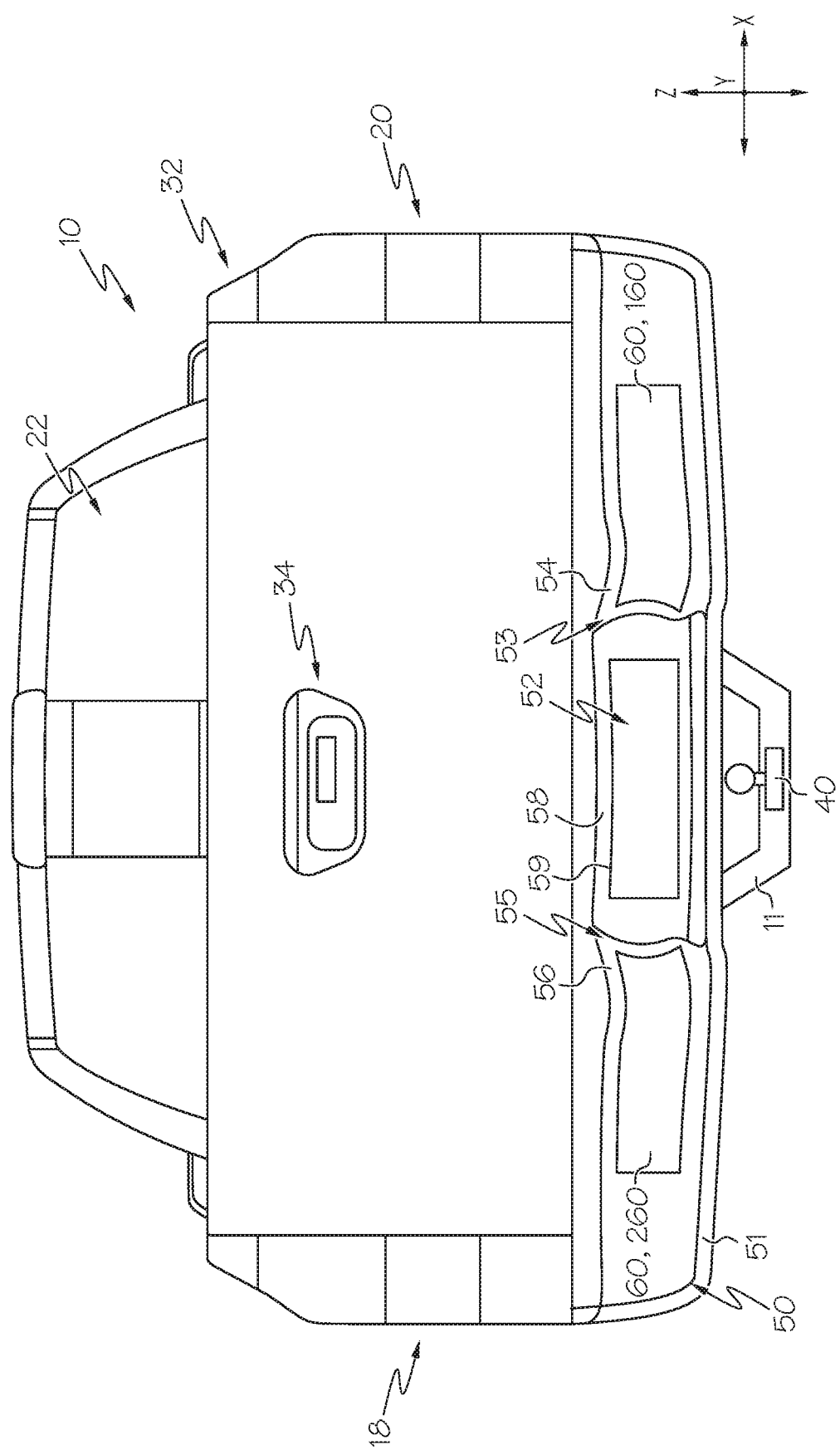
FIG. 2 is a rear view of the vehicle of FIG. 1, according to one or more embodiments shown and described herein.

Referring also to FIG. 2, the rear bumper 50 includes a bumper surface 51 and a license plate well 52 recessed into the rear bumper 50. The license plate well 52 comprises a first side 53 opposite a second side 55 in a vehicle longitudinal direction. Further, the license plate well 52 comprises a first well wall 54 disposed at the first side 53 opposite a second well wall 56 disposed at the second side 55. Both the first well wall 54 and second well wall 56 extend from the bumper surface 51 to a plate mounting surface 58. The plate mounting surface 58 provides a location to mount a license plate 59. In some jurisdictions, laws and/or regulations may require lights that illuminate the license plate 59 of the vehicle 10 during evening hours or periods of poor visibility. As described in detail below, the combined lighting assembly 60 (e.g., the first combined lighting assembly 160 and/or the second combined lighting assembly 260) is configured to illuminate the license plate well 52 and any license plate 59 mounted in the license plate well 52 such that the license plate 59 is visible to other vehicle operators, pedestrians, or the like, during evening hours and periods of poor visibility.

Figure 3:
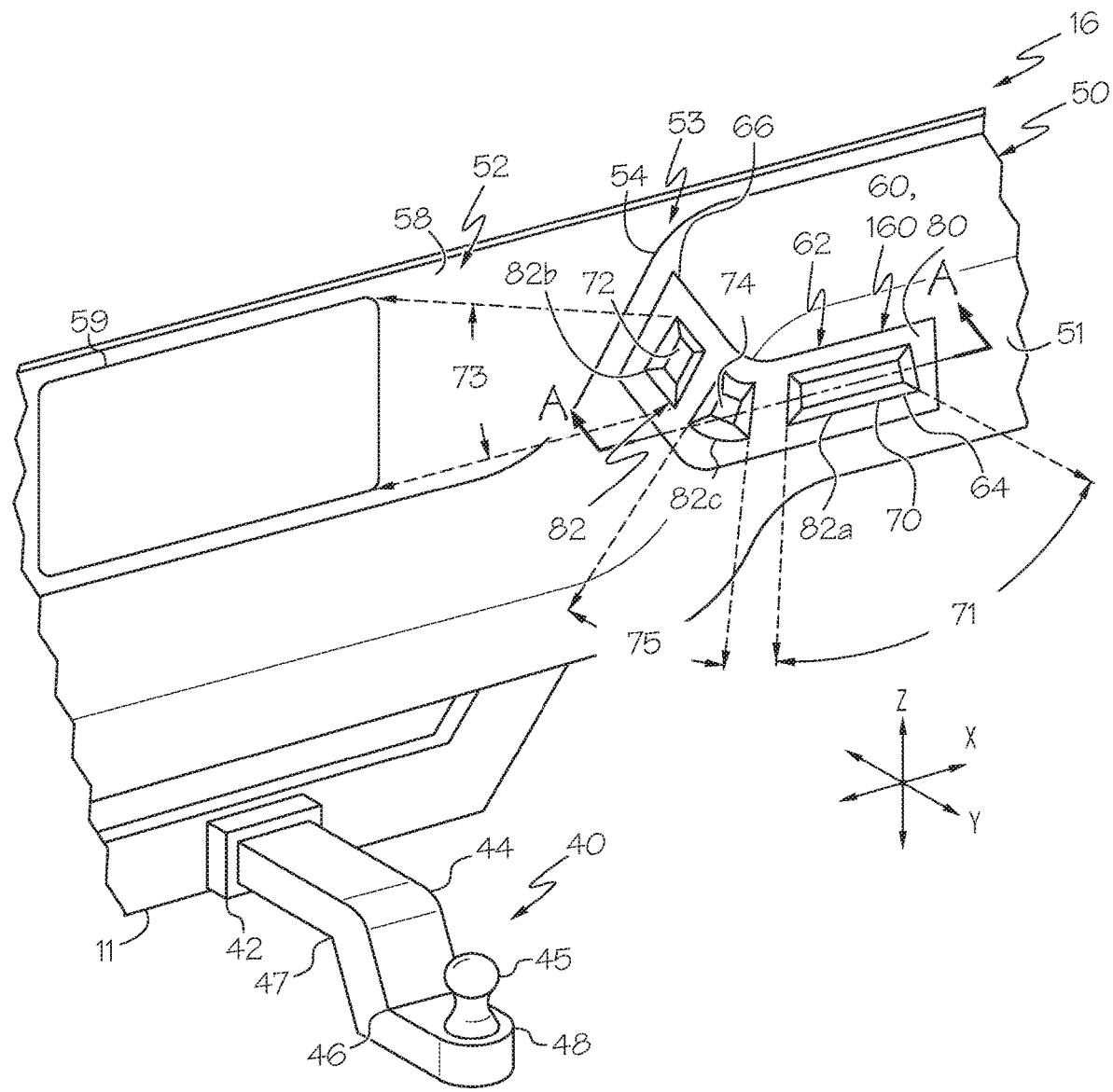
FIG. 3 is a partial perspective view of a rear bumper and a first combined lighting assembly of the vehicle of FIG. 1, according to one or more embodiments shown and described herein.
Figure 4:
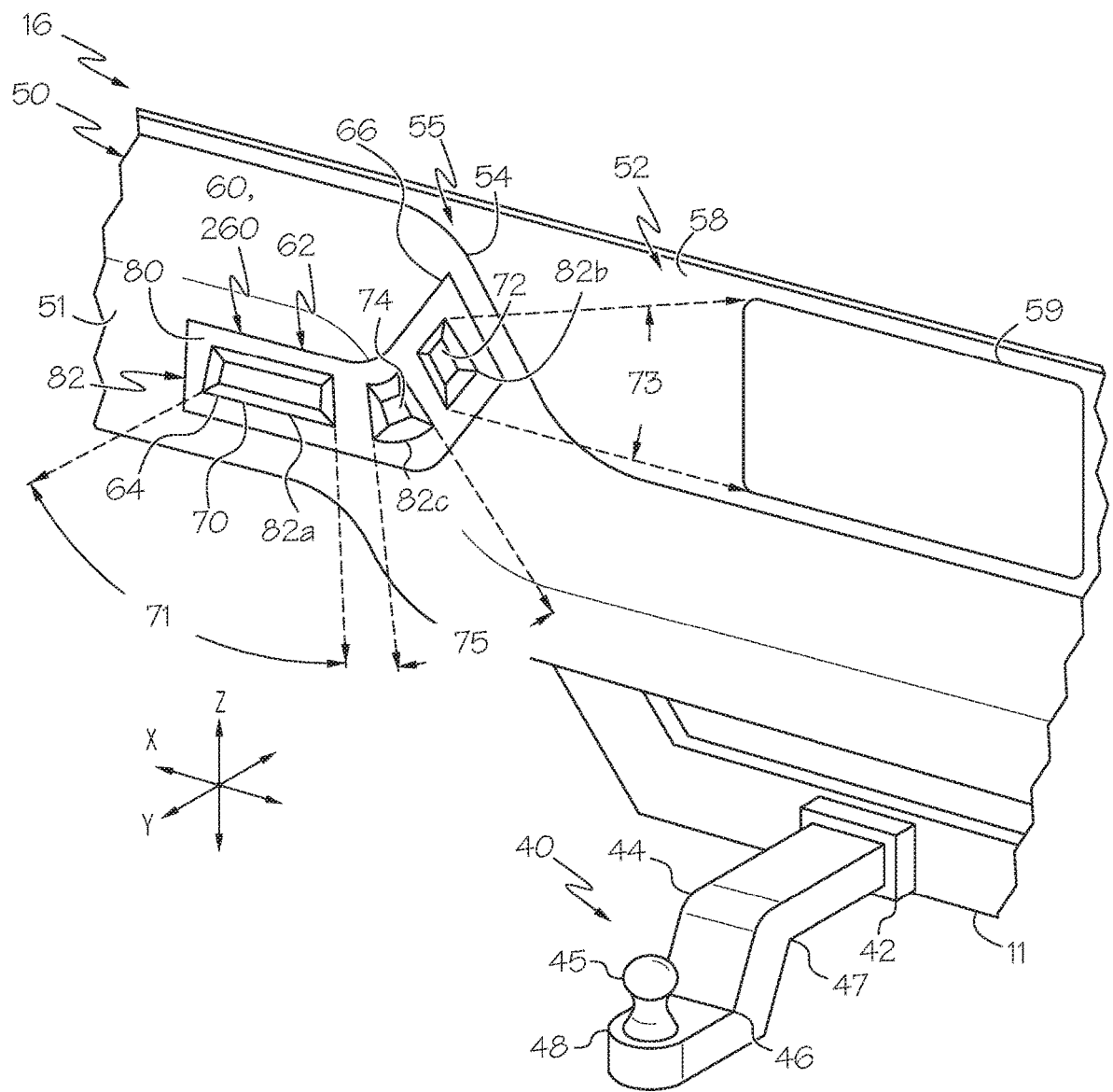
FIG. 4 is a partial perspective view of the rear bumper and a second combined lighting assembly of the vehicle of FIG. 1, according to one or more embodiments shown and described herein.

Referring now to FIGS. 3 and 4, two partial perspective views of the rear 16 of the vehicle 10 are depicted. In particular, FIG. 3 is a partial perspective view showing the towing hitch 40, the first side 53 of the license plate well 52, and the first combined lighting assembly 160 and FIG. 4 is a partial perspective view showing the towing hitch 40, the second side 55 of the license plate well 52, and the second combined lighting assembly 260. As shown in FIGS. 3 and 4, the towing hitch 40 is coupled to a frame 11 of the vehicle body 12 through a towing hitch receiving tube 42. In the illustrated embodiment, the towing hitch 40 comprises an elongate frame 44 that is insertable into the towing hitch receiving tube 42 and may be removably secured thereto through such means as a fastener or pin. The elongate frame 44 may comprise multiple bends 46, 47 that lead to a platform 48 on which a towing hitch ball 45 is coupled to the elongate frame 44. The towing hitch ball 45 may be coupled to the elongate frame 44 through a variety of methods including welding, fastening, and the like. In some embodiments, the towing hitch ball 45 may be interchangeable with other sized and shaped towing hitch balls. In operation, the towing hitch 40 provides a coupling location for a towable item to be attached to the vehicle 10, such as a trailer, camper, RV, boat, or the like. Often, these towable items are attached to the towing hitch 40 of the vehicle 10 during times of day when lighting is poor, making attachment difficult. However, as described in detail below, the combined lighting assembly 60 (e.g., the first combined lighting assembly 160 and the second combined lighting assembly 260) may be configured to illuminate the towing hitch 40, improving the lighting of the towing hitch 40 to facilitate attachment and release of towable items in low lighting conditions.

Referring still to FIGS. 3 and 4, each illustrated combined lighting assembly 60 (e.g., the first combined lighting assembly 160 of FIG. 3 and the second combined lighting assembly 260 of FIG. 4) comprises a lighting body 62 having an outward facing portion 64, a sideward facing portion 66, and a turned portion 68. The outward facing portion 64 is coupled to the sideward facing portion 66 by the turned portion 68 such that the lighting body 62 of the combined lighting assembly 60 is a single, continuous body. Further, each combined lighting assembly 60 comprises at least two of the following lights: a rearward facing light 70, a license plate light 72, and a towing hitch light 74. In the embodiments depicted in FIGS. 3 and 4, the each combined lighting assembly includes all three of the rearward facing light 70, the license plate light 72, and the towing hitch light 74. However, it should be understood that combinations of two of these lights are also contemplated. For example, some embodiments may include the rearward facing light 70 and the license plate light 72 (without the towing hitch light 74), some embodiments may include the rearward facing light 70 and the towing hitch light 74 (without the license plate light 72), and some embodiments may include the license plate light 72 and the towing hitch light 74 (without the rearward facing light 70).

The rearward facing light 70, the license plate light 72, and the towing hitch light 74 may each comprise a light emitting diode, an incandescent light, a fluorescent light, a combination thereof, or any other known or yet-to-be developed light source. Furthermore, the term "illumination region" is used herein to refer to a region that is illuminated by a light of the combined lighting assembly 60 when the light is on (e.g., the first combined lighting assembly 160 or the second combined lighting assembly 260). In operation, objects, such as the license plate 59 and the towing hitch 40, which are positioned unblocked within an illumination region may be illuminated by the combined lighting assembly 60.

Each combined lighting assembly 60 (e.g., the first combined lighting assembly 160 and the second combined lighting assembly 260) is disposed at the rear bumper 50 such that the sideward facing portion 66 of each extends into the license plate well 52 and the outward facing portion 64 of each faces in the vehicle rearward direction from the rear bumper 50. As depicted in FIG. 3, the first combined lighting assembly 160 is positioned such that the outward facing portion 64 of the first combined lighting assembly 160 is disposed at (e.g., coupled to or integral with) a portion of the bumper surface 51 adjacent the first side 53 of the license plate well 52, the sideward facing portion 66 of the first combined lighting assembly 160 is disposed at (e.g., coupled to or integral with) the first well wall 54, and the turned portion 68 of the first combined lighting assembly 160 is coupled to and disposed between the outward facing portion 64 and the sideward facing portion 66. As depicted in FIG. 4, the second combined lighting assembly 260 is positioned such that the outward facing portion 64 of the second combined lighting assembly 260 is disposed at (e.g., coupled to or integral with) a portion of the bumper surface 51 adjacent the second side 55 of the license plate well 52, the sideward facing portion 66 of the second combined lighting assembly 260 is disposed at (e.g., coupled to or integral with) the second well wall 56, and the turned portion 68 of the second combined lighting assembly 260 is coupled to and disposed between the outward facing portion 64 and the sideward facing portion 66.

Referring still to FIGS. 3 and 4, the rearward facing light 70 of each combined lighting assembly 160, 260 comprises a rearward illumination region 71 directed from the outward facing portion 64 of the lighting body 62 (e.g., in the vehicle rearward direction). In some embodiments, the rearward facing light 70 is coupled to the outward facing portion 64 of the lighting body 62. However, the rearward facing light 70 may be disposed in another location and additional components, such as light pipes, optical fibers, mirrors, or the like, may be positioned to direct light output by the rearward facing light 70 from the outward facing portion 64 to form the rearward illumination region 71. As depicted in FIGS. 3 and 4, the rearward illumination region 71 of the rearward facing light 70 is directed in the vehicle rearward direction from the rear bumper 50. In some embodiments, the rearward facing light 70 is a backup light configured to illuminate when a transmission of the vehicle 10 is in a reverse gear and in other embodiments, the rearward facing light 70 is a brake light configured to illuminate when the brakes of the vehicle 10 are engaged, for example, when a brake pedal of the vehicle 10 is depressed.

The license plate light 72 comprises a sideward illumination region 73 directed from the sideward facing portion 66 of the lighting body 62 (e.g., in the vehicle longitudinal direction). In some embodiments, the license plate light 72 is coupled to the sideward facing portion 66 of the lighting body 62. However, the license plate light 72 may be disposed in another location and additional components, such as light pipes, optical fibers, mirrors, or the like, may be positioned to direct light output by the license plate light 72 from the sideward facing portion 66 to form the sideward illumination region 73. The sideward illumination region 73 of the license plate light 72 is directed into the license plate well 52, for example, in a vehicle longitudinal direction from one of the first well wall 54 or the second well wall 56, to illuminate the plate mounting surface 58 to illuminate a license plate 59 mounted thereon.

Referring still to FIGS. 3 and 4, the towing hitch light 74 comprises an angled illumination region 75 directed from the turned portion 68 of the lighting body 62 (e.g., in the vehicle rearward direction, the vehicle longitudinal direction, and the vehicle downward direction). Further, in some embodiments, the towing hitch light 74 is coupled to the turned portion 68 of the lighting body 62. However, the towing hitch light 74 may be disposed in another location and additional components, such as light pipes, optical fibers, mirrors, or the like, may be positioned to direct light output by the towing hitch light 74 from the towing hitch light 74 to form the angled illumination region 75. Further, the angled illumination region 75 of the towing hitch light 74 is directed toward the towing hitch 40, for example, from the turned portion 68 of the lighting body 62 in both the vehicle rearward direction, the vehicle downward direction, and the vehicle longitudinal direction.

Referring still to FIGS. 3 and 4, in some embodiments, the lighting body 62 of each combined lighting assembly 60, 160, 260 comprises one or more opaque regions 80 and a plurality of windows 82. The one or more opaque regions 80 comprise an opaque material such that light generated by the rearward facing light 70, the license plate light 72, and/or the towing hitch light 74 is not transmitted through the one or more opaque regions 80. Further, the plurality of windows 82 comprise an opening, a transparent material, a translucent material, or the like, such that light is able to pass through the plurality of windows 82. In the illustrated embodiments, the plurality of windows 82 comprise an outward facing window 82*a* disposed at the outward facing portion 64 of the lighting body 62, a sideward facing window 82*b* disposed at the sideward facing portion 66 of the lighting body 62, and a turned window 82*c*, disposed at the turned portion 68 of the lighting body 62.

In some embodiments, the rearward facing light 70 may be disposed behind or at the outward facing window 82*a* such that light emitted by the rearward facing light 70 transmits through the outward facing window 82*a* in the rearward illumination region 71. The license plate light 72 may be disposed behind or at the sideward facing window 82*b* such that light emitted by the license plate light 72 transmits through the sideward facing window 82*b* into the sideward illumination region 73. Further, the towing hitch light 74 may be disposed behind or at the turned window 82*c* such that light emitted by the towing hitch light 74 transmits through the turned window 82c into the angled illumination region 75.

Figure 5:
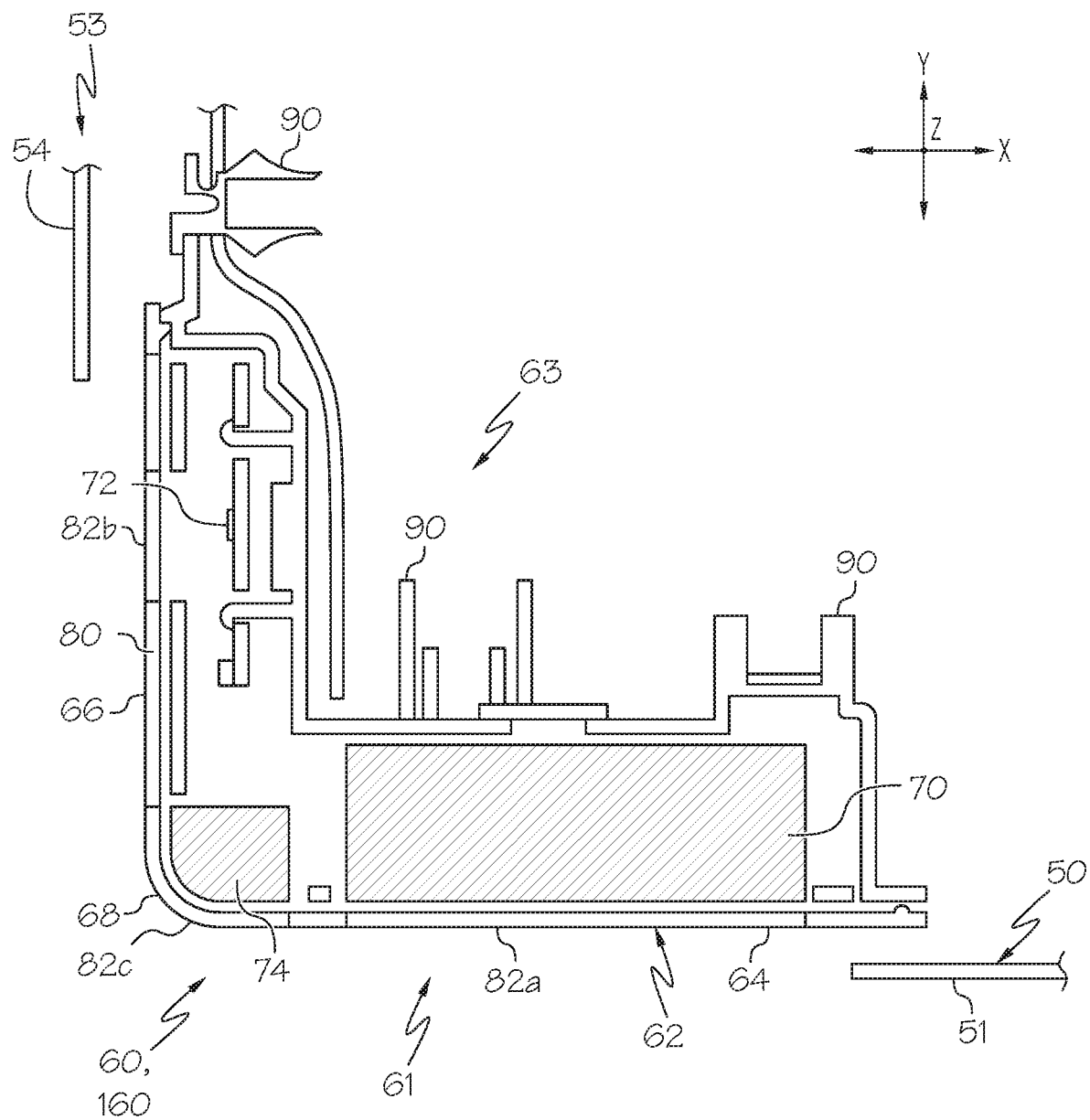
FIG. 5 is a cross-sectional view of the first combined lighting assembly taken along line A-A of FIG. 3, according to one or more embodiments shown and described herein.

Referring now to FIG. 5, a cross-sectional view of the first combined lighting assembly 160 taken along line A-A of FIG. 3 is depicted. While FIG. 5 depicts a cross-section of the first combined lighting assembly 160, it should be understood that the embodiment depicted in FIG. 5 may be the cross-section of any combined lighting assemblies described herein. As shown in FIG. 5, the first combined lighting assembly 160 comprises an outer side 61 opposite an inner side 63. The plurality of windows 82 are disposed at the outer side 61 and one or more connectors 90 are disposed at the inner side 63, for example, extending from the inner side 63. In some embodiments, at least one of the one or more connectors 90 comprises a mechanical connector configured to fix the first combined lighting assembly 160 to the rear bumper 50, for example, a snap fit connector, a friction fit connector, or the like. In some embodiments, at least one of the one or more connectors 90 comprises an electrical connector configured to electrically connect the first combined lighting assembly 160 with additional electrical components of the vehicle 10, for example, to provide power and control signals to the rearward facing light 70, the license plate light 72, and the towing hitch light 74. Further, in some embodiments, at least one of the one or more connectors 90 is both a mechanical connector and an electrical connector.

It should now be understood that the combined lighting assemblies described herein provide multi-directional illumination at a rear of a vehicle. The combined lighting assembly may be disposed at a rear bumper of a vehicle such that a portion of the combined lighting assembly faces a vehicle rearward direction and a portion of the combined lighting assembly extends into a license plate well of the rear bumper. To provide multi-directional illumination, the combined lighting assembly includes at least two of the following three lights: a rearward facing light directed from the outward facing portion in a vehicle rearward direction, which may operate as a reverse light or a brake light, a license plate light directed from the sideward facing portion into the license plate well to illuminate a license plate, and a towing hitch light directed from the turned portion to illuminate a towing hitch.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is also noted that recitations herein of "at least one" component, element, etc., should not be used to create an inference that the alternative use of the articles "a" or "an" should be limited to a single component, element, etc.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a rear bumper having a license plate well recessed into the rear bumper;
a towing hitch extending beyond the rear bumper in the vehicle rearward direction; and
a combined lighting assembly disposed at the rear bumper, wherein the combined lighting assembly comprises:
   a lighting body having an outward facing portion coupled to a sideward facing portion by a turned portion, wherein the sideward facing portion extends into the license plate well;
   a rearward facing light unit comprising a rearward illumination region directed in a vehicle rearward direction from the outward facing portion; and
   a license plate light unit comprising a sideward illumination region directed into the license plate well, wherein the license plate light is physically coupled to the sideward facing portion of the lighting body;
   a towing hitch light unit comprising an angled illumination region that is directed towards and illuminates the towing hitch through a turned window disposed at the turned portion that spans between and is non-orthogonal to both the outward facing portion and the sideward facing portion.

2. The vehicle of claim 1, wherein the rearward facing light unit is coupled to the outward facing portion of the lighting body.

3. The vehicle of claim 1, wherein the towing hitch light unit is coupled to the turned portion of the lighting body.

4. The vehicle of claim 3, further comprising a vehicle frame, wherein:
the towing hitch is coupled to the vehicle frame and extends beyond the rear bumper in the vehicle rearward direction and is disposed below the rear bumper in a vehicle downward direction; and
the angled illumination region of the towing hitch light unit is directed in both the vehicle rearward direction and the vehicle downward direction.

5. The vehicle of claim 1, wherein:
the rear bumper comprises a bumper surface;
the license plate well comprises a first well wall opposite a second well wall, each extending from the bumper surface to a plate mounting surface;
the outward facing portion of the lighting body is coupled to the bumper surface of the rear bumper; and
the sideward facing portion of the lighting body is coupled to the first well wall or the second well wall of the license plate well.

6. The vehicle of claim 1, wherein:
the rear bumper comprises a bumper surface;
the license plate well comprises a first well wall opposite a second well wall, each extending from the bumper surface to a plate mounting surface;
the outward facing portion of the lighting body is integral with the bumper surface of the rear bumper; and
the sideward facing portion of the lighting body is integral with the first well wall or the second well wall of the license plate well.

7. The vehicle of claim 1, wherein:
the combined lighting assembly is a first combined lighting assembly and the vehicle further comprises a second combined lighting assembly;
the first combined lighting assembly comprises a first lighting body having a first outward facing portion, a first sideward facing portion and a first turned portion, wherein the first sideward facing portion extends into the license plate well at a first side of the license plate well; and the second combined lighting assembly comprises a second lighting body having a second outward facing portion, a second sideward facing portion, and a second turned portion, wherein the second sideward facing portion extends into the license plate well at a second side of the license plate well.

8. The vehicle of claim 7, wherein the rear bumper comprises a bumper surface;

the license plate well comprises a first well wall opposite a second well wall, each extending from the bumper surface to a plate mounting surface;

the first outward facing portion is coupled to a portion of the bumper surface adjacent the first side of the license plate well;

the second outward facing portion is coupled to a portion of the bumper surface adjacent the second side of the license plate well;

the first sideward facing portion is coupled to the first well wall and comprises a first license plate light unit comprising a first sideward illumination region directed at the plate mounting surface; and the second sideward facing portion is coupled to the second well wall and comprises a second license plate light unit comprising a second sideward illumination region directed at the plate mounting surface.

9. The vehicle of claim 1, wherein the rearward facing light unit is a backup light configured to illuminate when a transmission of the vehicle is in a reverse gear.

10. The vehicle of claim 1, wherein the rearward facing light unit is a brake light configured to illuminate when a brake pedal of the vehicle is depressed.

11. The vehicle of claim 1, wherein the rearward facing light unit and the license plate light unit each comprise a light emitting diode, an incandescent light, a fluorescent light, or a combination thereof.

12. A combined lighting assembly for a vehicle that includes a towing hitch, the combined lighting assembly comprising:

a lighting body having an outward facing portion coupled to a sideward facing portion by a turned portion;

a rearward facing light unit coupled to the outward facing portion and comprising a rearward illumination region directed in a vehicle rearward direction from the outward facing portion;

a license plate light unit physically coupled to the sideward facing portion of the lighting body and comprising a sideward illumination region directed in a vehicle longitudinal direction from the sideward facing portion of the lighting body; and a towing hitch light unit comprising an angled illumination region that is directed towards and illuminates the towing hitch through a turned window disposed at the turned portion that spans between and is non-orthogonal to both the outward facing portion and the sideward facing portion.

13. The combined lighting assembly of claim 12, wherein the angled illumination region is directed in both the vehicle longitudinal direction and a vehicle downward direction from the turned portion.

14. The combined lighting assembly of claim 13, wherein the angled illumination region is directed in each of the vehicle longitudinal direction, the vehicle downward direction, and the vehicle rearward direction from the turned portion.

15. The combined lighting assembly of claim 12, wherein the lighting body comprises an opaque region and a plurality of window regions including at least one window region at the outward facing portion, at least one window region at the sideward facing portion, and at least one window region at the turned portion.

16. The combined lighting assembly of claim 15, wherein at least one window region of the plurality of window regions comprises an opening in the lighting body.

17. The combined lighting assembly of claim 15, wherein at least one window region of the plurality of window regions comprises a transparent material.

18. A vehicle that includes a towing hitch extending beyond the rear bumper in the vehicle rearward direction and a vehicle downward direction, the vehicle comprising:

a rear bumper comprising a bumper surface and a license plate well recessed into the rear bumper, the license plate well comprising a first well wall opposite a second well wall, each extending from the bumper surface to a plate mounting surface;

a first combined lighting assembly comprising a first lighting body having a first outward facing portion coupled to a portion of the bumper surface adjacent the first side of the license plate well, a first sideward facing portion coupled to the first well wall, and a first turned portion extending between and coupled to the first outward facing portion and the first sideward facing portion; and a second combined lighting assembly comprising a second lighting body having a second outward facing portion coupled to a portion of the bumper surface adjacent the second side of the license plate well, a second sideward facing portion coupled to the second well wall, and a second turned portion extending between and coupled to the second outward facing portion and the second sideward facing portion;

wherein the first combined lighting assembly and the second combined lighting assembly each comprise:

a rearward facing light unit comprising a rearward illumination region directed in a vehicle rearward direction;

a license plate light unit comprising a sideward illumination region directed toward the plate mounting surface of the license plate well, wherein the license plate light unit of the first combined lighting assembly is physically coupled to the first sideward facing portion and the license plate light unit of the second combined lighting assembly is physically coupled to the second sideward facing portion; and a towing hitch light unit comprising an angled illumination region that is directed towards and illuminates the towing hitch through a turned window disposed at the turned portion that spans between and is non-orthogonal to both the outward facing portion and the sideward facing portion.

19. The vehicle of claim 18, wherein; the rearward facing light unit of the first combined lighting assembly is coupled to the first outward facing portion and the rearward facing light unit of the second combined lighting assembly is coupled to the second outward facing portion.

20. The vehicle of claim 18 wherein the towing hitch is longitudinally disposed between the first well wall and the second well wall of the license plate well, wherein; the towing hitch light unit of the first combined lighting assembly is coupled to the first turned portion and the towing hitch light unit of the second combined lighting assembly is coupled to the second turned portion.

\* \* \* \* \*